US008632617B2

(12) United States Patent
Münkel et al.

(10) Patent No.: US 8,632,617 B2
(45) Date of Patent: *Jan. 21, 2014

(54) FILTER HAVING A DRAINAGE CONNECTION (75) Inventors: Karlheinz Münkel, Oberderdingen-Flehingen (DE); Stefan Becker, Mannheim (DE); Duc Cuong Nguyen, Laatzen (DE)

(73) Assignee: Mann+ Hummel GmbH, Ludwigsburg (DE)

( * ) Notice: Subject to any disclaimer, the term of this patent is extended or adjusted under 35 U.S.C. 154(b) by 12 days.

This patent is subject to a terminal disclaimer.

(21) Appl. No.: 13/062,863

(22) PCT Filed: Aug. 11, 2009

(86) PCT No.: PCT/EP2009/060367
§ 371 (c)(1),
(2), (4) Date: Jan. 26, 2012

(87) PCT Pub. No.: WO2010/028922
PCT Pub. Date: Mar. 18, 2010

(65) Prior Publication Data
US 2012/0167534 A1 Jul. 5, 2012

(30) Foreign Application Priority Data
Sep. 9, 2008 (DE) .......................... 10 2008 046 499

(51) Int. Cl.
B01D 46/00 (2006.01)

(52) U.S. Cl.
USPC ............. 55/423; 55/498; 55/502; 55/DIG. 17

(58) Field of Classification Search
USPC ........ 55/323, 330, 337, 343, 349, 385.3, 462, 55/423, 447; 95/277; 123/196 A, 198 E; 210/440, 350, 232, 442, 450, 453, 457, 210/493.2
See application file for complete search history.

(56) References Cited

U.S. PATENT DOCUMENTS

| 4,615,315 | A  | * | 10/1986 | Graham ..................... 123/196 A |
| 5,385,592 | A  | * | 1/1995  | Maeda ............................ 55/323 |
| 6,058,899 | A  | * | 5/2000  | Schetter .................... 123/196 A |
| 6,959,819 | B2 | * | 11/2005 | Moscaritolo et al. ......... 210/440 |
| 2002/0162781 | A1 | * | 11/2002 | Demirdogen ................ 210/232 |
| 2009/0008320 | A1 | * | 1/2009 | Harder et al. ................ 210/440 |
| 2011/0303604 | A1 | * | 12/2011 | McKenzie .................... 210/350 |
| 2012/0180750 | A1 | * | 7/2012 | Thienel ..................... 123/196 A |

FOREIGN PATENT DOCUMENTS

DE 19806929 A1 8/1999

OTHER PUBLICATIONS

PCT search report of PCT/EP2009/060367.

* cited by examiner

Primary Examiner — Duane Smith
Assistant Examiner — Minh-Chau Pham
(74) Attorney, Agent, or Firm — James Hasselbeck (57) ABSTRACT The invention relates to a filter (1) having a drainage outlet (31), which can be tightly connected to a connecting head (12). It is proposed to use an insertion seal having radially opposite sealing surfaces of an outer seal (23) and an inner seal (24).

20 Claims, 7 Drawing Sheets

FILTER HAVING A DRAINAGE CONNECTION

CROSS REFERENCE TO RELATED APPLICATIONS

This application is US National Stage Entry of international patent application no. PCT/EP2009/060367, filed Aug. 11, 2009 designating the United States of America, the entire disclosure of which is incorporated herein by reference. This application claims priority from German application 10 2008 046499.6 filed in Germany on Sep. 9, 2008, and which is hereby incorporated by reference in its entirety.

TECHNICAL FIELD

The invention concerns a filter having a filter housing and a filter insert that is received therein and has a filter element; a filter end disk arranged at an end face of the filter insert; and a collecting chamber for liquid that has been separated by the filter which liquid, by means of a drainage conduit that is in communication with the collecting chamber and provided in the filter end disk, can be removed from the filter.

Such a filter has moreover a filter closure system for sealtightly connecting a connecting end of the circular cylindrical filter housing provided at an end face with a connecting head that corresponds to the connecting end, into which connecting head the connecting end, in an axial insertion direction, can be inserted or attached and, for example, by means of an insertion and rotation movement, can be connected with positive fit to the connecting head, wherein the connecting end and the connecting head may have at least at one connecting location a bayonet connection.

The filter closure system serves for producing a pressure-tight and/or gas-tight and/or liquid-tight connection between the filter housing and the connecting head. The invention is directed also to filters that are provided for one-time mounting as well as to those where the filter is exchanged regularly during maintenance or repair work A preferred field of application of such filters are stationary and movable compressed air devices. The compressors used in this connection (usually screw compressors) generate a pressure of up to approximately 20 bar, typically approximately 7 to 8 bar and require oil for lubrication, sealing and cooling of the moving parts so that oil-containing gases are generated. Per cubic meter of air approximately 5 liters of oil must be injected into the screw compressor. Removal of oil from the compressed air is thus an important task. In order to recover most of this oil and to purify the compressed air by removing the oil, oil separating elements are used that during the course of maintenance of the device are to be exchanged regularly.

These oil separating elements are the filter elements of a corresponding filter and are arranged in a filter housing. The filter medium is usually a coil filter or a coalescence filter. The filters or the filter elements inserted into the filter housing are usually disposable parts because the filter elements not only separate the oil that is returned into the oil circulation of the compressed air device and is reused, but also are clogged over time by deposited dirt particles. A similar application of such oil separating elements or oil separators is provided in vacuum pumps.

Other applications of such filters are use as liquid filters that remove dirt particles or other components from a liquid, for example, oil filters, fuel filters, hydraulic liquid filters, cooling medium filters, water separators or process filters for separating large dirt quantities from processing liquids, in particular in case of grinding, eroding or spark-erosion processes. Filters are also used as liquid separators that separate liquid or solid contaminants from a gas stream, in particular in internal combustion engines, for example, when cleaning oil-containing venting gases of the crankcase.

In fields of oil filtration and oil separation from air, a filter must particularly fulfill requirements with regard to pressure and temperature resistance. Important features are usually also a simple, self-explanatory manipulation that excludes operating errors as well as inexpensive manufacture and/or disposal.

PRIOR ART

In the prior art, primarily filters with filter closure systems have been established that are based on threaded connections. Here, a filter housing is in general screwed with a centrally arranged thread that is disposed on an end disk inserted into the filter housing onto a corresponding threaded socket of the connecting head and a sealing action is provided by means of several distributed sealing means in the form of axially sealing O-rings. Moreover, bayonet connections are also known.

Based on this prior art, the object of the invention resides in that a filter is to be provided in which in a simple way a seal-tight connection can be produced and which is inexpensive with respect to manufacture and/or disposal.

SUMMARY OF THE INVENTION

The filter according to the invention comprises a filter housing and a filter insert received therein and having a filter element, a filter end disk arranged on the filter insert at the end face, and a collecting chamber for liquid separated by the filter, which liquid is removable from the filter by means of a drainage conduit arranged in the filter end disk and communicating with the collecting chamber. The filter according to the invention has the special feature that the filter end disk comprises an elastic outer seal that serves for sealing the raw side of the filter relative to the collecting chamber and comprises an elastic inner seal that serves for sealing the clean slide of the filter relative to the collecting chamber, wherein the outer seal has a circumferentially extending outer sealing surface that faces in radial direction inwardly and the inner seal has a circumferentially extending inner sealing surface that in radial direction faces outwardly; the outer sealing surface and the inner sealing surface arranged opposed to one another and delimiting an intermediately positioned sealing space therebetween in radial direction; and the outer seal and the inner seal are formed as an interacting insertable seal, wherein, for closing the insertable seal, the filter in an axial insertion direction is insertable or attachable onto a connecting head corresponding with the filter, wherein the connecting head has a circumferentially extending web that is inserted into the sealing space and radially seals together with the outer and/or inner seal, by a clamping or pressfit action, the sealing space.

Expressed in a simplified way, a filter is proposed in which the sealing function between raw side and clean side that, according to the prior art, is effected by several O-rings that are provided at different locations and act radially outwardly is effected by compression, achieved by insertion, of opposed sealing surfaces with an intermediately positioned web A filter according to the invention has the advantages that in a simple way a seal-tight connection can be produced wherein a simple, self-explanatory manipulation that precludes operating errors is enabled. Moreover, the manufacture and/or disposal can be realized in an inexpensive way.

Further advantages of the invention are the utilization in tight spaces and at low costs and the advantageous realization of metal-free embodiments of the filter including filter housing, filter element and closure, which not only has advantages with respect to corrosion resistance but also for the disposal of spent filters.

Especially advantageous are embodiments in which the filter housing has a bayonet connector for connection with the connecting head. In this way, a high-strength connection with great load and retention force can be achieved that is moreover achieved with minimal mounting forces, and a quick mounting and demounting possibility is also provided because, in contrast to screw-on filters, it is not required to carry out several turns of the filter for the screw-on action and unscrew action.

In particular in the embodiment with a bayonet closure metal-free filters can be produced because, in contrast to the prior art, no stable filter end disk provided with a central thread at the end face, i.e., end disk made of metal, is required in order to screw on tightly the screw-on filter onto a threaded socket of the connecting head. Therefore, the filter end disk can be designed to be significantly weaker, i.e., thinner and/or made of plastic material. This is so because the distribution of forces between the filter housing and the connecting head, i.e., the force introduction between these two parts for producing the mechanical connection, is better for a multi-row bayonet closure that is positioned father outwardly on the filter housing than for a central thread. Accordingly, the entire filter, comprising the filter housing and a filter element arranged therein as well as the filter end disk at the end face, can be produced free of metal.

A further advantage for metal-free embodiments is provided in that plastic parts with respect to manufacture can be produced with high cleanness in a less complex way in comparison to metal parts. Metal parts have residues in the form of cuttings, oil and sweat deposits which must be removed in a complex cleaning process wherein there is the risk that residues remain. In contrast, plastic parts can be produced by injection molding without such residues with great cleanness.

A further advantage of the filter according to the invention, in particular in the embodiment with an exterior bayonet closure, resides in that the filter end disk at the end face can be designed freely for supply and removal of fluids. In this way, the flow conditions in the filter and the separation action of the filter can be improved and pressure loss can be reduced also.

Moreover, a filter according to the invention that has no conventional radial seals but instead has a seal acting by compression with an insertion function provides the advantages of a reduced number of parts, reduced assembly costs, avoidance of errors in manufacture, improved sealing function as a result of improved adjustment of the compression of the sealing surfaces, a greater tolerance compensation, space savings as well as optionally elimination of a separately insertable seal.

BRIEF DESCRIPTION OF THE DRAWINGS

The invention will be explained in the following in more detail with the aid of an embodiment illustrated in the drawings. The special features described therein may be used individually or in combination with each other in order to provide preferred embodiments of the invention. The drawings show in.

EMBODIMENT(S) OF THE INVENTION

Figure 1:
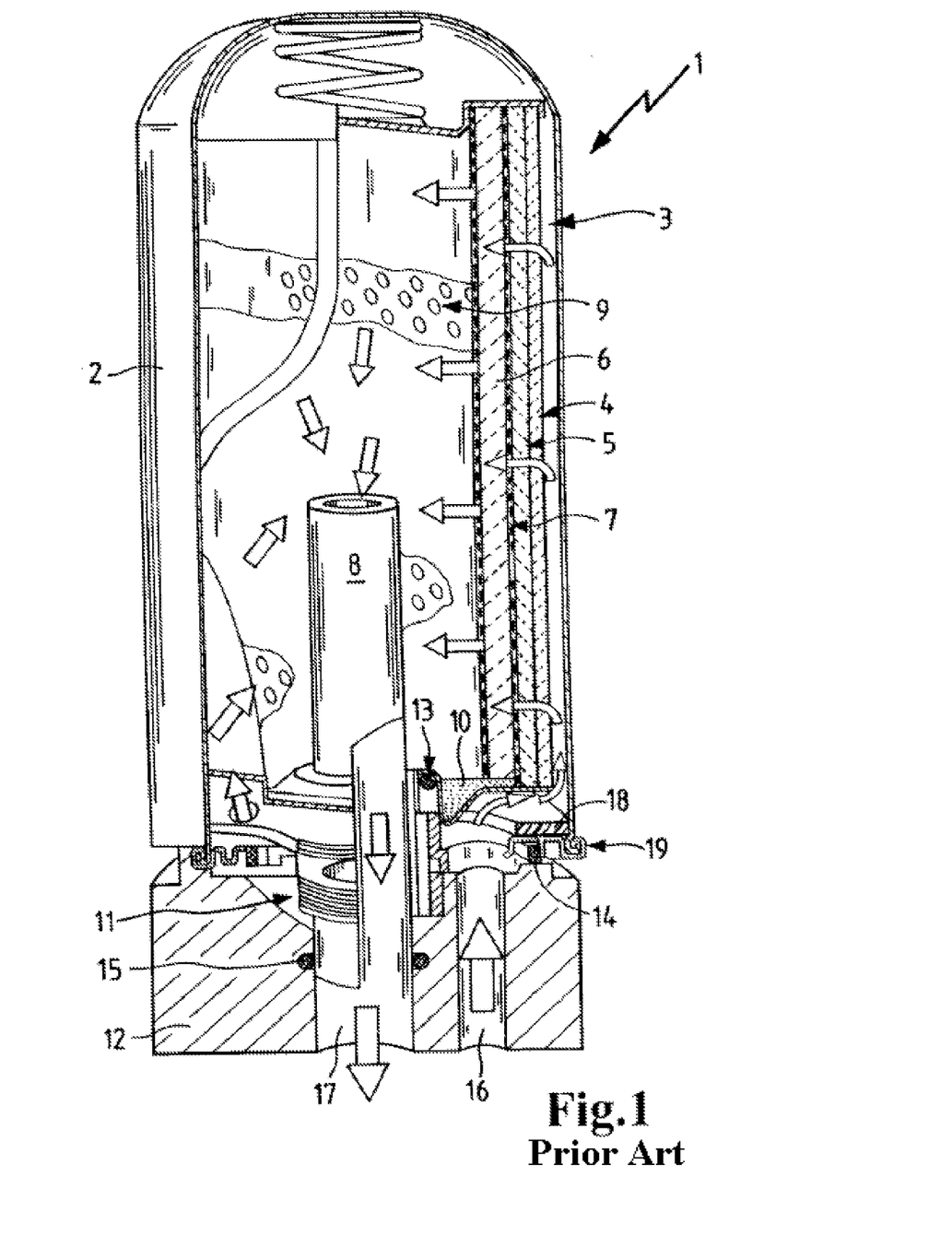
FIG. 1 a partially sectioned perspective illustration of a filter according to the prior art on a connecting head.

FIG. 1 shows a filter 1 according to the prior art that is embodied as a screw-on filter, so-called spin-on filter, as an oil separator in a device for generating compressed air. The filter 1 serves for removing oil from air and comprises a pressure-resistant, circular cylindrical filter housing 2 that is comprised of plastic or metal and is embodied as a filter cup or filter pot. In the filter housing 2 there is a filter element 3 that is flowed through radially from the exterior to the interior and thereby separates the oil. In the illustrated embodiment, the filter element 3 comprises a pre-separator 4, a fine separator 5, and an after-separator 6.

Moreover, a pressure-stable support pipe 7 for the pre-separator 4 and the fine separator 5, a further support pipe 9 for the after-separator 6 as well as an immersion pipe 8, that is also referred to as clean air pipe or removal socket and that ensures spatial separation of the removal location for the de-oiled compressed air and the separated oil, are located in the filter 1. The separated oil drains in the filter 1 into an oil sump in a collecting chamber 10 that is therefore also referred to as drainage chamber, is removed through a drainage connector and is returned into the oil circulation of the compressed air device. The drainage connector for removal of the separated oil from the oil sump is not illustrated.

The filter 1 is seal-tightly connected by a central axial screw-on fitting 11 with a connecting head 12 of the compressed air device. A radial and axial sealing action is provided by three seals in the form of O-rings 13, 14, 15 arranged in distributed fashion and not interacting with each other. The connecting head 12 has at the raw side of the filter 1 an outlet 16 for the air/oil mixture to be cleaned that enters the filter 1 through an appropriate opening and flows through the filter element 3 radially from the exterior to the interior as well as an inlet 17 at the clean side of the filter 1 through which, via the immersion pipe 8, the de-oiled compressed air removed from the filter 1 is returned into the compressed air device.

The end face of the filter housing 2 is formed by a stable filter end disk 18 that is embodied of metal and is connected by means of crimping 19 with the filter housing 2.

The filter 1 illustrated in FIG. 1 is a so-called upright variant in which the filter 1 is arranged above the connecting head 12. The reverse embodiment in which the filter 1 is arranged below the connecting head 12 is referred to as a suspended variant. It differs substantially in that it comprises a conduit passing through the filter 1 across the axial length for suction removal of the oil sump.

In some embodiments it may be provided that upon exchange of the filter only the filter element 3 is exchanged and the filter housing 2 is reused. In other embodiments the filter housing 2 and the filter element 3 inserted therein form a unit that represents a joined disposal part.

Figure 2:
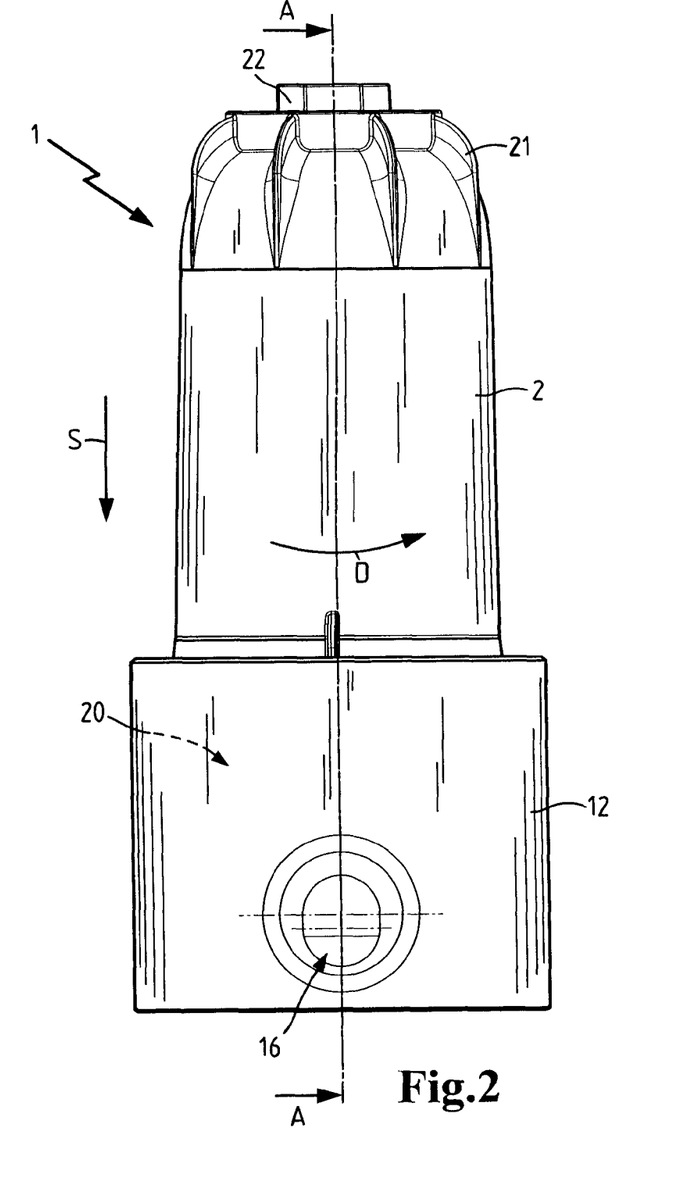
FIG. 2 a view of a filter according to the invention with a connecting head after mounting of the filter on the connecting head.

In FIG. 2 a filter 1 according to the invention is illustrated that substantially differs in regard to the sealing device for seal-tightly connecting the end face of the filter 1 with a corresponding connecting head 12. In this connection, the filter element 3 and the filter end disk 18 can be designed differently.

The filter housing 2 is insertable or attachable in axial insertion direction S into the connecting head 12 and can be connected by an insertion rotation movement positively with the connecting head 12. The rotation direction D for mounting the filter housing 2 is illustrated by an arrow. The filter housing 1 and the connecting head 12 are preferably connected by a bayonet closure 20.

For connecting the filter 1 with the connecting head 12 the filter housing 2 is inserted in the insertion direction S into the connecting head 12 and thereafter turned by rotation of the filter housing 2 in the rotation direction D. In this way, the bayonet closure is closed and the filter 1 is seated fixedly on or in the receiving head 12. In addition to this mechanical connection sealing elements are provided, for example, O-rings, sealing lips or sealing rings that effect a pressure-tight sealing action. For facilitating mounting or demounting, the filter housing 2 has a grip part 21 or a tool engagement area 22, for example, a hexagon socket or hexagon head.

Figure 3:
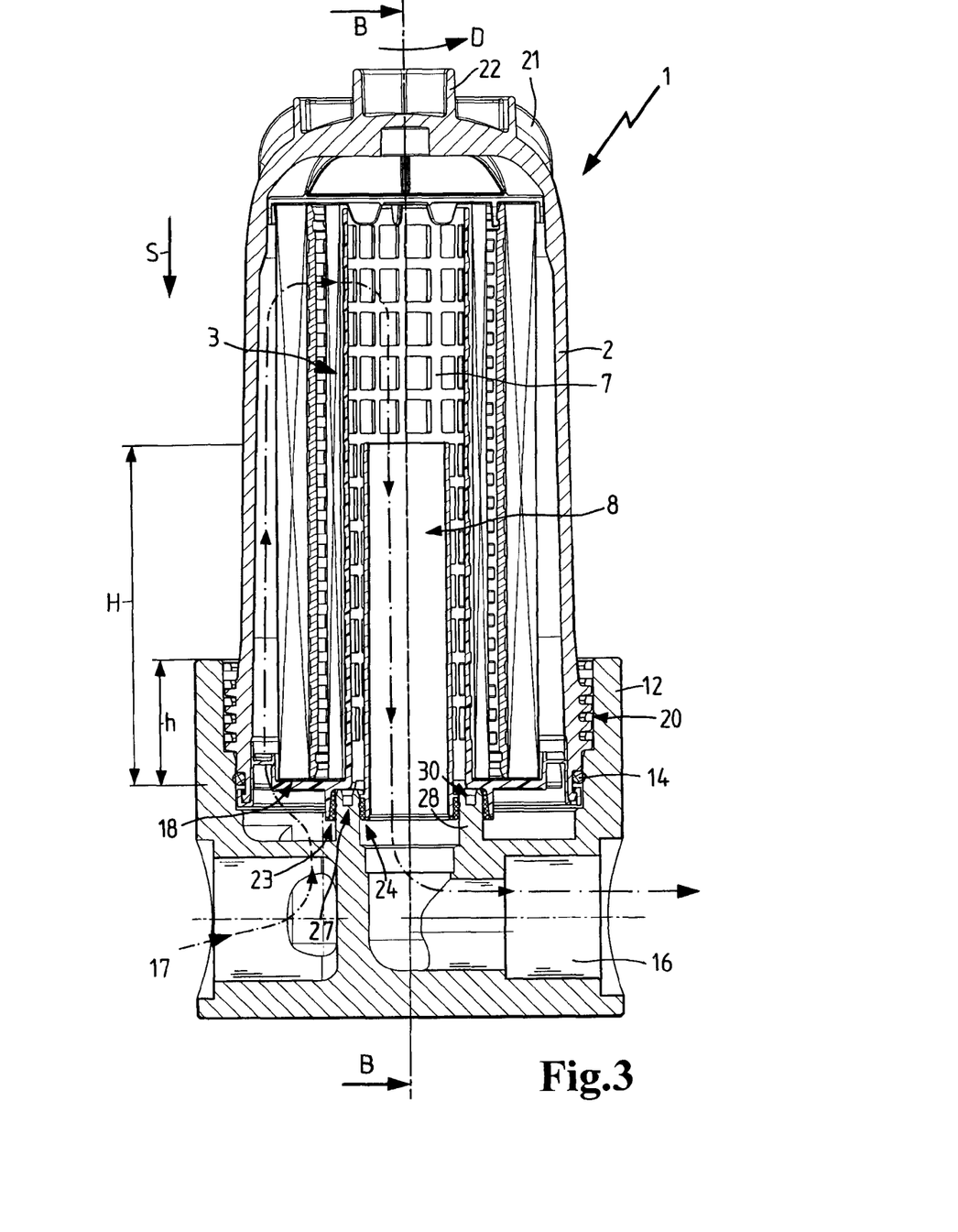
FIG. 3 a section A-A of FIG. 2.
Figure 4:
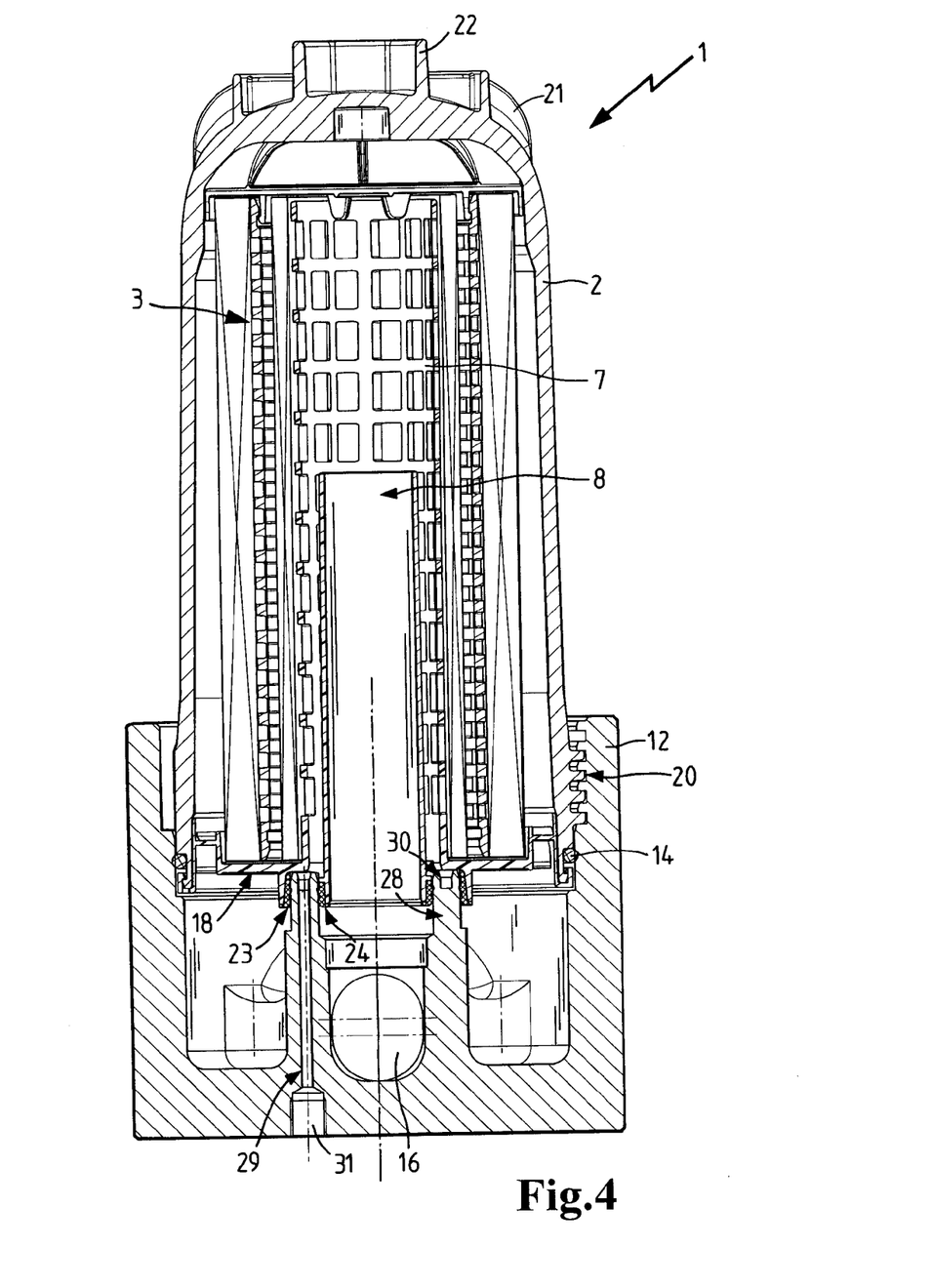
FIG. 4 a section B-B of FIG. 3.
Figure 5:
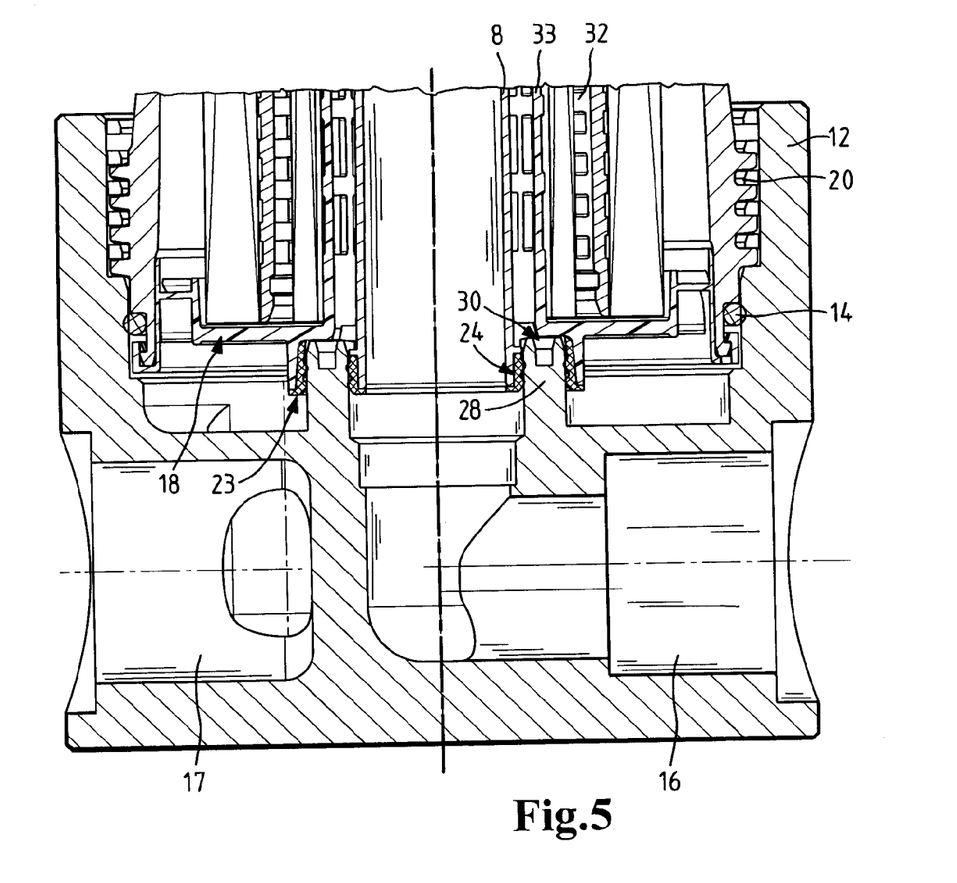
FIG. 5 a detail of FIG. 3.
Figure 6:
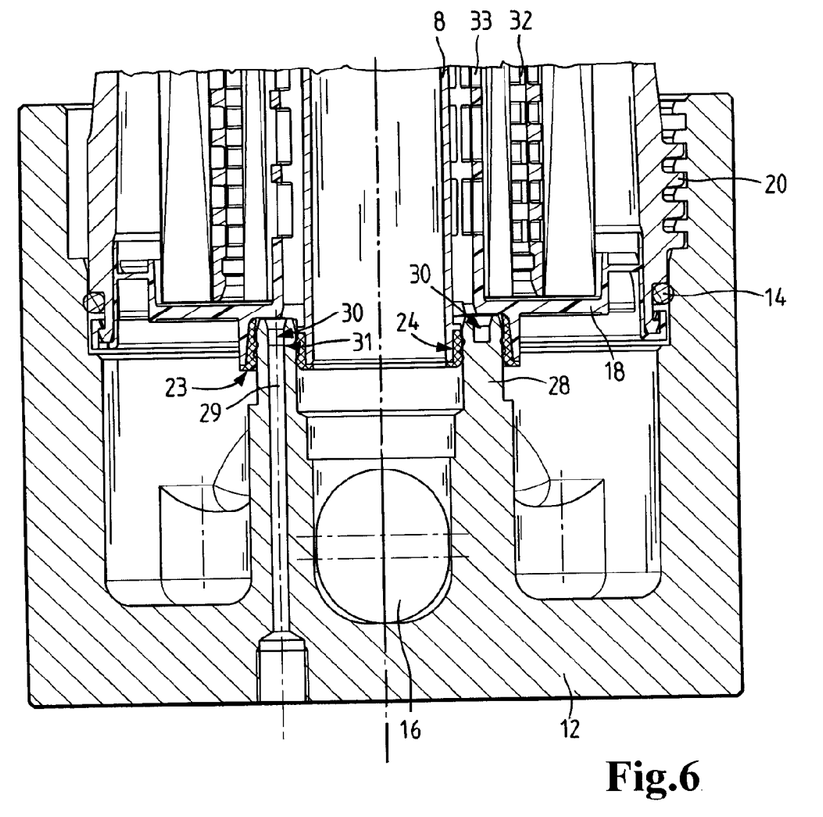
FIG. 6 a detail of FIG. 4.
Figure 7:
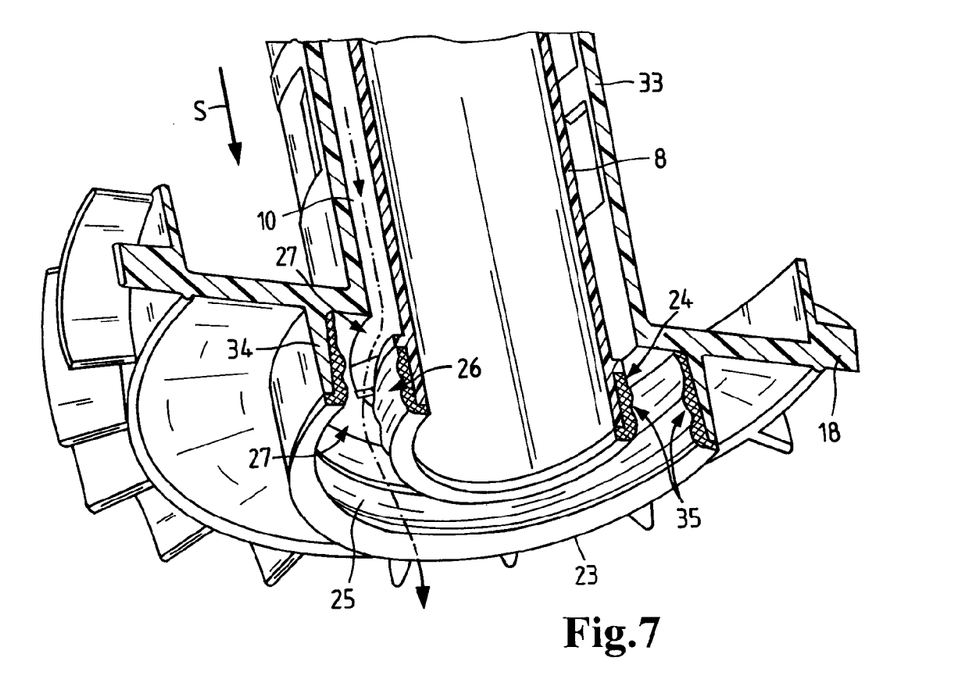
FIG. 7 a sectioned perspective partial view of a filter end disk of the filter according to the invention.

FIGS. 3 and 4 show two longitudinal sections of the filter 1 of FIG. 2 after mounting, i.e. with closed bayonet closure 20. FIGS. 5 and 6 show details of FIGS. 3 and 4. FIG. 7 shows a corresponding perspective view. FIGS. 3 to 7 will be explained jointly in the following.

In the filter 1 according to the invention the filter end disk 18 comprises an elastic outer seal 23 that serves for sealing the raw side of the filter 1 and an elastic inner seal 24 for sealing the clean side of the filter 1. In this connection, the outer seal 23 has a circumferentially extending outer sealing surface 25 that is facing in radial direction inwardly and an inner seal 24 with a circumferentially extending inner sealing surface 26 that in radial direction faces outwardly. The outer sealing surface 25 and the inner sealing surface 26 are positioned opposed to each other and delimit an intermediately positioned circumferential sealing space 27. The sealing space 27 is thus the space between the two sealing contours or sealing flanks of the outer sealing surface 25 and the inner sealing surface 26.

The connecting head 12 has a circumferentially extending web 28 that upon mounting of the filter housing 2 on the connecting head 12 is inserted into the sealing space 27 and seals the sealing space 27 in radial direction inwardly and outwardly by a clamping action or press fit with the outer seal 23 and the inner seal 24. The outer seal 23 and the inner seal 24 are thus embodied as an insertable seal interacting with the circumferentially extending web 28 wherein for closing the insertable seal the filter 1 in axial insertion direction S is inserted into or attached to the connecting head 12 corresponding with the filter 1.

According to a preferred embodiment it is provided that the oil drainage is integrated into the seal. For this purpose, the filter 1 is designed such that liquid from the collecting chamber 10 of the filter 1 can be removed through a drainage conduit 29 that is passing through the web 28 arranged in the sealing space 27. For this purpose, the connecting head 12 has a drainage conduit 29 passing through the web 28. Moreover, it is advantageous when the web 28 is provided on the surface that is facing the filter 1 with a circumferential groove 30 for collecting liquid in the oil sump and for guiding the collected liquid to a drainage outlet 31 through which the oil drainage can be lead into the drainage conduit 29.

The web 28, when mounting the filter 1 on the connecting head 12, is inserted into the sealing space 27. The fixation of the filter housing 2 on the connecting head 12 is realized by means of the bayonet closure 20 which in the illustrated embodiment is a multi-row bayonet closure in order to be able to receive great forces even in an embodiment made of plastic material.

Advantageously, the filter end disk 18 comprises an immersion pipe 8 projecting into the interior of the filter housing 2. In a preferred embodiment it is comprised, like the filter end disk 18, of plastic material and is injection-molded integrally with the filter end disk 18. Advantageously, the inner seal 24 can be arranged on the exterior side of the immersion pipe 8. Moreover, the filter 1 advantageously may comprise a support pipe 7 provided for a filter medium and projecting from the filter end disk 18 into the interior of the filter housing 2. In the illustrated embodiment, these are a first central pipe 32 provided for the fine separator and glued to the filter end disk 18 and a second central pipe 33 that is provided for the after separator and is integrally injection-molded. Advantageously, the outer seal 23 can be arranged on the inner side of a support pipe 8 or on a support web 34 that projects in axial direction from the filter end disk 18 and is preferably a monolithic part of the filter end disk 18.

The entire filter 1 comprising the filter housing 2 and the filter element 3 with filter end disk 18, support pipe 7 and immersion pipe 8, can be embodied free of metal. In this connection, the filter element 3 or the filter end disk 18 can be glued, for example, into the filter housing 2. Such an embodiment has a very minimal height h that is significantly smaller than the height H of a corresponding conventional filter 1 in which the immersion pipe 8 is integrated into the connecting head 12 and therefore the filter must be removed across the immersion pipe 8.

In this way, also for longer immersion pipes 8 the advantage of a minimal space requirement is achieved. The immersion pipe 8 should not be embodied too short because, as a result of airflow in the area of the oil sump, oil turbulence or oil atomization can be generated and therefore the removal location for clean air, i.e., the entry opening into the immersion pipe 8, must be positioned far enough away from the oil sump. As seen in FIG. 3, the immersion pipe 8 defines a clean side chamber within the immersion pipe 8 through which the filtered fluid exits the filter element 3 and end disk 18.

In particular FIG. 7 shows clearly that the outer sealing surface 25 of the outer seal 23 and the inner sealing surface 26 of the inner seal 24 have a two-dimensional component and extend in the axial direction of the filter 1 in order to achieve in this way across a greater area an excellent sealing action. Moreover, the sealing surfaces 25, 26 comprises one or several circumferentially extending sealing contours, for example, depressions or ribs or sealing lips 35 in order to increase, on the one hand, the pressing force to obtain a good sealing action and, on the other hand, to facilitate the insertion action.

In FIG. 7, the path on which the separated oil is guided from the oil sump through the drainage integrated into the seal into the drainage conduit 29 is illustrated by an arrow. The circumferentially extending sealing space 27 is embodied as a collecting chamber 10 for the liquid separated from the filter 1, for example, oil in case of an oil separator, because the collecting chamber 10 passes into the sealing space 27 or is in communication therewith. Also shown are the circumferentially extending sealing lips 35 in the outer seal 23 and in the inner seal 24. The sealing lips 35 in the outer seal 23 replaces with regard to their function the O-ring 13 of the filter 1 according to the prior art shown in FIG. 1 and the sealing lips 35 in the inner seal 24 replace with regard to their function the O-ring 15 of the filter 1 according to the prior art shown in FIG. 1.

In preferred embodiments the outer seal 23 and/or the inner seal 24 are formed of thermoplastic elastomer. A thermoplastic elastomer is a plastic material that behaves in the same way as rubber. In preferred embodiments the outer seal 23 and/or the inner seal 24 are applied by an injection-molding processes onto the filter element 3, for example, the filter end disk 18. In this way, the material of the seals is fused with the filter element 3 or the filter end disk 18 which results in high seal-tightness, inexpensive manufacture and avoidance of errors with regard to wrong seals or wrongly inserted seals.

The inventive sealing system comprising an elastic outer seal and an elastic inner seal, wherein the outer seal has a circumferentially extending outer sealing surface that in radial direction faces inwardly and the inner seal has a circumferentially extending inner sealing surface that in radial direction faces outwardly, the outer sealing surface and the inner sealing surface arranged opposed to each other and delimiting therebetween an intermediately positioned circumferential sealing space in radial direction, and the outer seal and the inner seal embodied as an interacting insertable seal, wherein for closing the insertable seal the filter in an axial insertion direction is insertable into or attachable to a connecting head that corresponds to the filter, wherein the connecting head has a circumferentially extending web that is then inserted into the sealing space and seals the sealing space radially by a clamping action or press fit with the outer and inner seals, can also be employed in a filter with a filter housing and a filter insert received therein and having a filter element, a filter end disk arranged on the end face of the filter insert that has no collecting chamber for the liquid that is separated by the filter and is to be removed from the filter by means of a drainage conduit that is provided in the filter end disk and communicates with the collecting chamber, for example, an oil filter for separating dirt particles from an oil flow in which the dirt particles are separated in the filter insert. In this case, the seal system does not serve for sealing the raw side of the filter relative to the collecting chamber and for sealing the clean side of the filter relative to the collecting chamber, but has the function of an O-ring, i.e., separates the raw side from the clean side.

The invention claimed is:

1. A filter (1), comprising:
    a filter housing (2);
    a filter insert received into an interior chamber of said filter housing, said filter insert having a raw side through which a gaseous fluid to be filtered enters said filter insert and a clean side outlet chamber (8) through which the filtered gaseous fluid exits said filter insert, said filter insert including
        a filter element (3);
        a collecting chamber (10) extending axially within the filter insert and arranged between said raw side of the filter insert and said clean side outlet chamber of the filter insert and draining liquid separated from the gaseous fluid by the filter (1);
        a filter end disk (18) arranged at an end face on said filter insert, said end disk including
            a drainage conduit (29) in fluid communication with said collecting chamber (10) and operative to drain said separated liquid to an exterior of said filter housing;
            an elastic circumferential outer seal (23) mounted on said end disk and operative to fluidicially sealably separate a raw side (16) of said filter (1) from said collecting chamber (10);
            an elastic circumferential inner seal (24) arranged at said end disk and operative to fluidically sealably separate a clean side (17) of said filter (1) from said collecting chamber (10);
        wherein said outer seal (23) forms a circumferentially extending outer sealing surface (25), said outer sealing surface facing in radial direction inwardly,
        wherein said inner seal (24) forms a circumferentially extending inner sealing surface (26), said inner sealing surface facing in radial direction outwardly,
        wherein said outer sealing surface (25) and said inner sealing surface (26) are positioned in a concentric arrangement and sealably delimit a circumferentially extending sealing space (27) positioned radially between said outer and inner sealing surfaces,
        wherein said outer seal (23) and said inner seal (24) are each embodied as an interacting insertable seal, wherein axially connecting said filter to a connecting head (12) in an axial insertion direction (S), said outer and inner seals sealably interact with said connecting head to form said fluidic seals sealing said receiving space therebetween,
        wherein the connecting head (12) has a circumferentially extending web (28) that is inserted into said sealing space (27) between said outer and inner seals, wherein said circumferentially extending web (28) radially seals said sealing space (27) with the outer and inner seals by clamping or a press fit of said outer and inner seals against said circumferentially extending web (28).

2. The filter according to claim 1, wherein said circumferentially extending sealing space (27) is embodied as a collecting chamber (10) receiving said separated liquids.

3. The filter according to claim 2, wherein said drainage conduit (29) is arranged within said circumferentially extending web (28), said drainage conduit (29) operative to drain said separated liquid from said sealing space (27).

4. The filter according to claim 1, wherein said sealing surface of said outer seal (23) and/or said inner seal (24) has at least one non-flat circumferentially extending two-dimensional sealing contour, said sealing surface embodied to extend in axial direction of the filter (1).

5. The filter according to claim 4, wherein said sealing surface of said at least one non-flat circumferentially extending two-dimensional sealing contour having depressions and/or ribs and/or sealing lips (35).

6. The filter according to claim 1, wherein said outer seal (23) and/or said inner seal (24) is formed of a thermoplastic elastomer.

7. The filter according to claim 1, wherein said outer seal (23) and/or said inner seal (24) is formed onto said filter element (3) or said filter end disk (18) by an injection-molding process.

8. The filter according to claim 1, wherein said filter is embodied as a filter for removing oil from air.

9. The filter according to claim 1, further comprising
    an immersion pipe (8) secured to said end disk (18) and projecting axially inwardly from said end disk (18) into said interior of said filter housing (2).

10. The filter according to claim 9, wherein said inner seal (24) is arranged on an outer surface of said immersion pipe (8).

11. The filter according to claim 1, wherein
    said filter element further includes at least one support pipe (7, 9) secured to and projecting axially inwardly from said filter end disk (18) into an interior of said filter housing (2), said at least one support pipe (7, 9) supporting a filter medium arranged thereon.

12. The filter according to claim 1, wherein said outer seal (23) is arranged on a inner surface of one of said at least one said support pipe.

13. The filter according to claim 1, wherein said filter housing (2) or said filter end disk (18) further includes a bayonet connector (20) operative to axially engage and rotatably mount said filter onto said connecting head (12).

14. The filter according to claim 1, wherein said filter is embodied free of metal.

15. A connecting head for axially connecting and mounting a filter according to claim 1, said connecting head comprising:
    a circumferentially extending web (28) sized and configured to inserted into said sealing space (27) of said filter (1) when mounting said filter (1) onto said connecting head (12).

16. The connecting head according to claim 15, wherein said connecting head comprises a drainage conduit (29) passing through said circumferentially extending web (28).

17. The connecting head according to claim 16, wherein said connecting head includes a drainage outlet (31) for said separated liquids of the filter,
    wherein said circumferentially extending web (28) includes a web surface that in axial direction faces said filter (1), said web surface including a circumferential groove (30) formed therein and operative to collect said separated liquid and guide said separated liquid to said drainage outlet (31) through said drainage conduit (29).

18. A filter connecting system, comprising
a filter according to claim 1; and
a connecting head axially connecting and mounting the filter, said connecting head comprising:
    a circumferentially extending web (28) sized and configured to inserted into said sealing space (27) of said filter (1) when mounting said filter (1) onto said connecting head (12).

19. A compressed air device for generating compressed air comprising
a filter according to claim 1; and
a connecting head axially connecting and mounting the filter, said connecting head comprising:
    a circumferentially extending web (28) sized and configured to inserted into said sealing space (27) of said filter (1) when mounting said filter (1) onto said connecting head (12).

20. An internal combustion engine comprising
a filter according to claim 1; or
a connecting head axially connecting and mounting the filter, said connecting head comprising:
    a circumferentially extending web (28) sized and configured to inserted into said sealing space (27) of said filter (1) when mounting said filter (1) onto said connecting head (12).

* * * * *